US010115497B2

(12) United States Patent
Zheng et al.

(10) Patent No.: US 10,115,497 B2
(45) Date of Patent: Oct. 30, 2018

(54) COMPRESSIVE GRAPHENE HYDROGEL AND PREPARATION METHOD THEREFOR

(71) Applicant: FUZHOU UNIVERSITY, Fuzhou (CN)

(72) Inventors: Yuying Zheng, Fuzhou (CN); Xianbin Liu, Fuzhou (CN); Jinxian Lin, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 29 days.

(21) Appl. No.: 15/521,305

(22) PCT Filed: Jan. 21, 2015

(86) PCT No.: PCT/CN2015/071228
§ 371 (c)(1),
(2) Date: Apr. 24, 2017

(87) PCT Pub. No.: WO2016/061926
PCT Pub. Date: Apr. 28, 2016

(65) Prior Publication Data
US 2017/0309365 A1  Oct. 26, 2017

(30) Foreign Application Priority Data

Oct. 22, 2014  (CN) .......................... 2014 1 0563543

(51) Int. Cl.
*H01B 1/24* (2006.01)
*C01B 32/184* (2017.01)

(52) U.S. Cl.
CPC .............. *H01B 1/24* (2013.01); *C01B 32/184* (2017.08); *C01B 2204/22* (2013.01); *C01B 2204/26* (2013.01)

(58) Field of Classification Search
CPC ... H01B 1/24; C01B 2204/22; C01B 2204/26; C01B 31/04; C01B 32/184; C01B 32/20
See application file for complete search history.

(56) References Cited

U.S. PATENT DOCUMENTS

2015/0232340 A1* 8/2015 Bao .......................... C01B 31/04
264/29.1
2017/0174522 A1* 6/2017 Park ..................... C01B 31/0484

FOREIGN PATENT DOCUMENTS

CN  101941693 A  1/2011
CN  103399063 A  11/2013
(Continued)

OTHER PUBLICATIONS

Liu, S. et al., "Three-dimensional graphene oxide/phytic acid composite for uranium(VI) sorption," J Radioanal Nucl Chem (2015) 306:507-514 (Year: 2015).*
(Continued)

*Primary Examiner* — Mark Kopec
*Assistant Examiner* — Jaison P Thomas
(74) *Attorney, Agent, or Firm* — Luoh J. Wu; Continent Patent Office LLP

(57) ABSTRACT

This present invention disclosed a compressive graphene hydrogel and relates to a preparation method thereof. The compressive graphene hydrogel is obtained using the oxidized graphene and phytic acid as raw materials, wherein the oxidized graphene is used as the precursor. The obtained graphene hydrogel has a rich micro gap structure, a super large surface area, and high conductivity.

4 Claims, 3 Drawing Sheets

(56) References Cited

FOREIGN PATENT DOCUMENTS

| CN | 103768960 | A | | 5/2014 | | |
|---|---|---|---|---|---|---|
| CN | 103896256 | A | | 7/2014 | | |
| CN | 103399063 | B | * | 7/2015 | ............... | H01B 1/00 |
| KR | 101577190 | B1 | * | 12/2015 | ............... | H01B 1/00 |

OTHER PUBLICATIONS

Zhang, C. et al., "Synthesis of Phosphorus-Doped Graphene and its Multifunctional Applications for Oxygen Reduction Reaction and Lithium Ion Batteries," Adv. Mater. 2013, 25, 4932-4937 (Year: 2013).*

Quanshi Gao et al; Self-Assembled Graphene Hydrogel via a One-Step Hydrothermal Process; 2010 American Chemical Society; Jun. 30, 2010; 4324-4330; vol. 4; No. 7.

* cited by examiner

COMPRESSIVE GRAPHENE HYDROGEL AND PREPARATION METHOD THEREFOR

CROSS REFERENCE TO RELATED APPLICATIONS

This application is the national phase entry of International Application No. PCT/CN2015/071228, filed on Jan. 21, 2015, which is based upon and claims priority to Chinese Patent Application No. 201410563543.4, filed on Oct. 22, 2014, the entire contents of which are incorporated herein by reference.

TECHNICAL FIELD OF THE INVENTION

The present invention, which discloses a compressive graphene hydrogel and a preparation method thereof, belongs to the field of nanometer materials and electrochemistry and electrochemical field.

BACKGROUND OF THE INVENTION

Graphene is a one-atom-thick planar sheet of $sp^2$-bonded carbon atoms that are densely packed in a honeycomb lattice, It is considered to be the basic unit to construct other dimension SP2 carbon materials. The unique structure of graphene enabled a large specific surface, good electrical conductivity and excellent chemical stability, which has aroused extensive research. It is easy for graphene sheets to agglomerate because of the π-π interactions. Therefore, it is very meaningful to construct three-dimensional graphene macroscopic material with single graphene. In 2010, Gaoquan Shi and others first prepared graphene hydrogel by hydrothermal method (ACS Nano, 2010, 4, 4324-4330). It is worth noting that the mechanical properties of pure graphene hydrogels are poor, which can't meet the requirements of practical applications. Therefore, it is important to improve the physical and mechanical properties of the hydrogel.

Phytic acid is a kind of green environmental protection organic acid which exists widely in nature, easy to form a stable structure between molecules, and whose six membered ring structure has good stability, good electrical conductivity and strong complexing ability. The invention adopted the hydrothermal method, which was used as a coupling agent between the graphene sheets, can avoid irreversible aggregation of graphene, enhanced mechanical properties of graphene hydrogels, but can also improve the conductivity of graphene hydrogels because of the phytic acid's good conductivity.

SUMMARY OF THE INVENTION

The present invention aims at provide a compressive graphene hydrogel and a preparation method thereof. The compressive graphene hydrogel disclosed herein offers the features of a more pore structure, higher compressive strength, better structural stability then the prior art. It is excellent in electrochemical performance when used as the material of the supercapacitors. Also the preparation method is simple and feasible, the sources of raw material is rich, its unique structure and properties will make it wide used.

The compressive graphene hydrogel obtainable by using the oxidized graphene and the phytic acid as raw materials.

The process for preparing the compressive graphene hydrogel using the hydrothermal method: use the oxidized graphene as precursor, adding water into said oxidized graphene to make an aqueous solution, place the said aqueous solution in the reactor lining, doping phytic acid, carry out the reaction after mixing, freeze-dried the reaction product to get said compressive graphene hydrogel.

Wherein the concentration of graphene oxide in said aqueous solution is 1-4 mg/mL.

Wherein the amount of phytic acid in every 60 mL aqueous solution is 1-10 mL.

Wherein the reaction is carried out at temperature 120-180° C. for 12-24 h.

The invention has the following advantages:

(1) Under the action of the six-membered ring phytic acid dopant, the graphene oxide self-assembled to form the macroscopic three-dimensional material, and can effectively prevent the agglomeration and stacking of graphene sheets, obtain high specific surface and electrical conductivity, and its performance can be adjusted by the addition of phytic acid, reaction temperature and time.

(2) The mechanical strength of the material was significantly improved after the addition of phytic acid, and the compressive modulus of the material was obviously higher than that of pure graphene hydrogel, which can be applied to the preparation of composite electrode materials of super capacitors.

(3) The material obtained by this method has the advantages of controllable morphology, stable structure, excellent performance, and will promote the popularization of graphene in practical application.

DETAILED DESCRIPTION OF THE INVENTION

Figure 1:
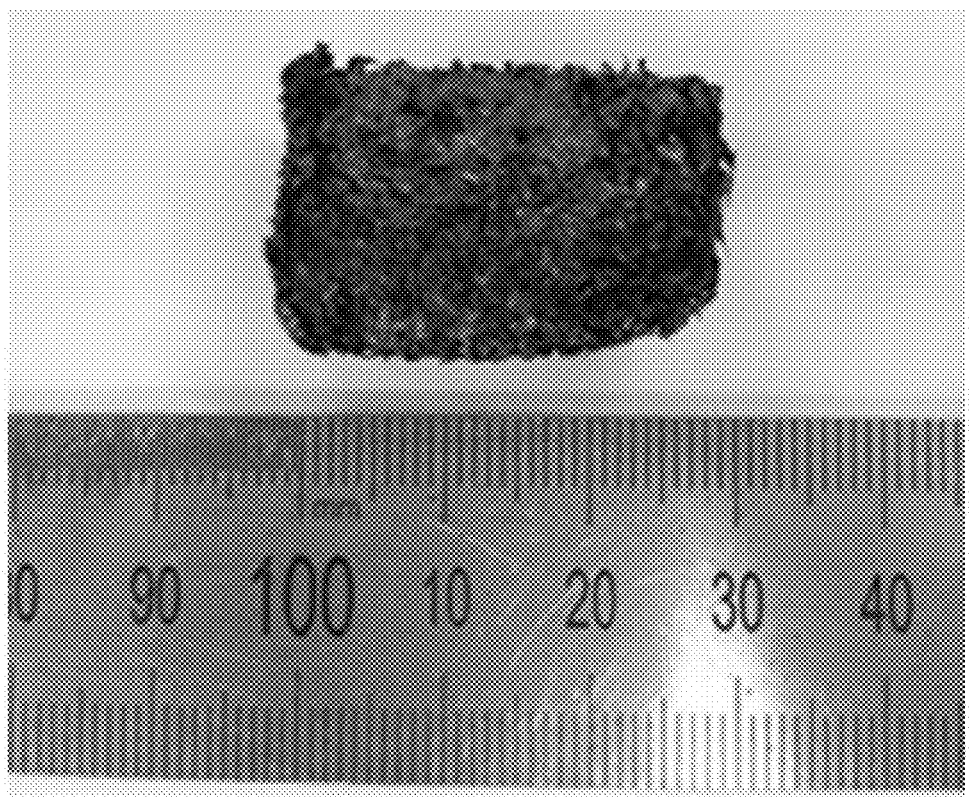
FIG. 1 shows the appearance of the graphene hydrogel prepared by Embodiment 1.

The present invention is further described in the following exemplified embodiments to illustrate the application of the principles of the invention. It is understood that the invention may be embodied otherwise without departing from such principles. The scope of the claims of the present invention expressly should not be limited to such exemplary or preferred embodiments.

Embodiment 1

In this embodiment, the present application provides a compressive graphene hydrogel using the following method:

Step (1) slowly added 3 g of natural flake graphite to 150 mL of sulfuric acid/phosphoric acid ($H_2SO_4:H_3PO_4=9:1$, v/v) mixed acid solution, followed by adding 18 g of potassium permanganate, mixed evenly, raise the system temperature to 50° C., reacted for 12 h, washed the products with hydrochloric acid and deionized water respectively until the pH is neutral and the rotational speed was 11000 r/min, freeze-dried to get the graphite oxide.

Step (2) added the graphite oxide of Step (1) to the water, obtained aqueous solution of graphene oxide by ultrasonic dispersion, the concentration of the oxidized graphite is 1 mg/mL, took 60 mL of the aqueous solution in the Teflon-lined autoclave, added 4 mL of phytic acid, mixed evenly, and then placed in the reaction 12 h at 150° C.

Step (3) collected the cylindrical graphene hydrogel by step (2), soaked and washed with deionized water for 24 h, obtained the macro porous graphene hydrogel finally by freeze-drying.

Figure 2:
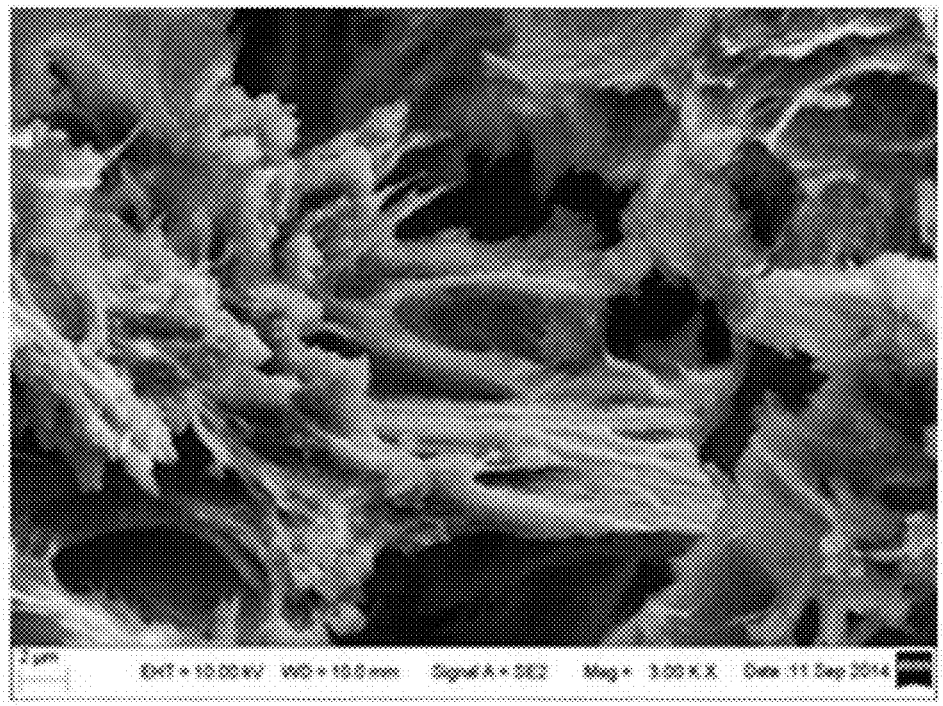
FIG. 2 shows the scanning electron micrograph image of graphene hydrogel prepared by Embodiment 1.
Figure 3:
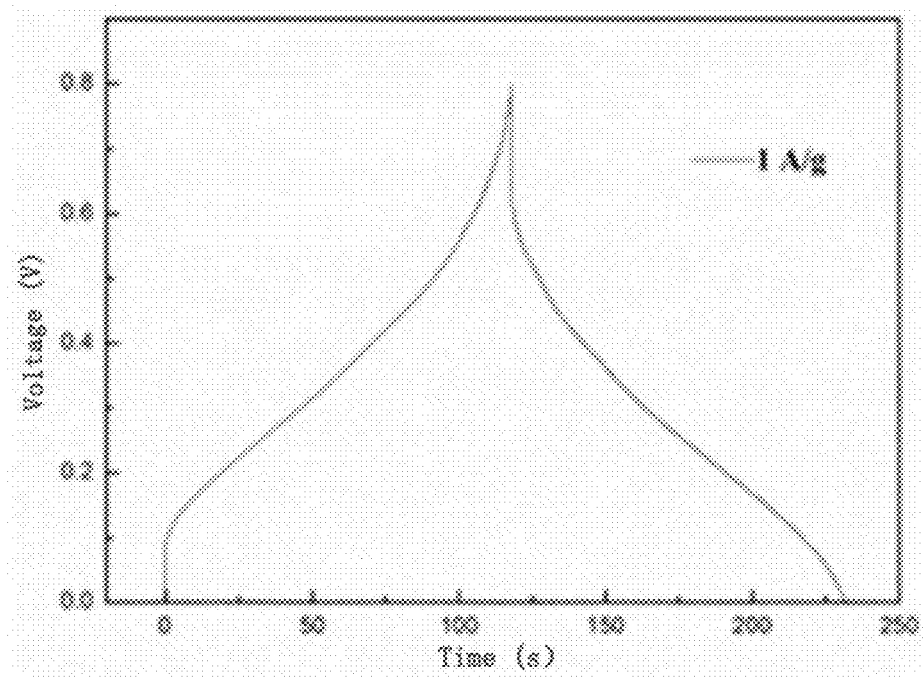
FIG. 3 shows the constant current charge-discharge curves of the graphene hydrogel electrode material prepared by Embodiment 1.

The appearance and scanning electron micrograph image of the graphene hydrogel prepared by this embodiment were shown in FIG. 1 and FIG. 2. And FIG. 3 showed the constant current charge-discharge curves of the graphene hydrogel electrode material under the condition of current density of 1 A/g shows. The specific capacitance calculated by formula $Cs=(I\times\Delta t)/(m\times\Delta V)$ was 237.5 F/g, which meets the requirements of practical application.

Embodiment 2

In this embodiment, the present application provides a compressive graphene hydrogel using the following method:

Step (1) slowly added 3 g of natural flake graphite to 150 mL of sulfuric acid/phosphoric acid ($H_2SO_4$:$H_3PO_4$=9:1, v/v) mixed acid solution, followed by adding 18 g of potassium permanganate, mixed evenly, raise the system temperature to 50° C., reacted for 12 h, washed the products with hydrochloric acid and deionized water respectively until the pH is neutral and the rotational speed was 11000 r/min, freeze-dried to get the graphite oxide.

Step (2) added the graphite oxide of Step (1) to the water, obtained aqueous solution of graphene oxide by ultrasonic dispersion, the concentration of the oxidized graphite is 1 mg/mL, took 60 mL of the aqueous solution in the Teflon-lined autoclave, added 1 mL of phytic acid, mixed evenly, and then placed in the reaction 12 h at 1501° C.

Step (3) collected the cylindrical graphene hydrogel by step (2), soaked and washed with deionized water for 24 h, obtained the macro porous graphene hydrogel finally by freeze-drying.

Embodiment 3

In this embodiment, the present application provides a compressive graphene hydrogel using the following method:

Step (1) slowly added 3 g of natural flake graphite to 150 mL of sulfuric acid/phosphoric acid ($H_2SO_4$:$H_3PO_4$=9:1, v/v) mixed acid solution, followed by adding 18 g of potassium permanganate, mixed evenly, raise the system temperature to 50° C., reacted for 12 h, washed the products with hydrochloric acid and deionized water respectively until the pH is neutral and the rotational speed was 11000 r/min, freeze-dried to get the graphite oxide.

Step (2) added the graphite oxide of Step (1) to the water, obtained aqueous solution of graphene oxide by ultrasonic dispersion, the concentration of the oxidized graphite is 2 mg/mL, took 60 mL of the aqueous solution in the Teflon-lined autoclave, added 4 mL of phytic acid, mixed evenly, and then placed in the reaction 12 h at 150° C.

Step (3) collected the cylindrical graphene hydrogel by step (2), soaked and washed with deionized water for 24 h, obtained the macro porous graphene hydrogel finally by freeze-drying.

Embodiment 4

In this embodiment, the present application provides a compressive graphene hydrogel using the following method:

Step (1) slowly added 3 g of natural flake graphite to 150 mL of sulfuric acid/phosphoric acid ($H_2SO_4$:$H_3PO_4$=9:1, v/v) mixed acid solution, followed by adding 18 g of potassium permanganate, mixed evenly, raise the system temperature to 50° C., reacted for 12 h, washed the products with hydrochloric acid and deionized water respectively until the pH is neutral and the rotational speed was 11000 r/min. freeze-dried to get the graphite oxide.

Step (2) added the graphite oxide of Step (1) to the water, obtained aqueous solution of graphene oxide by ultrasonic dispersion, the concentration of the oxidized graphite is 4 mg/mL, took 60 mL of the aqueous solution in the Teflon-lined autoclave, added 1 mL of phytic acid, mixed evenly, and then placed in the reaction 12 h at 150° C.

Step (3) collected the cylindrical graphene hydrogel by step (2), soaked and washed with deionized water for 24 h, obtained the macro porous graphene hydrogel finally by freeze-drying.

Embodiment 5

In this embodiment, the present application provides a compressive graphene hydrogel using the following method:

Step (1) slowly added 3 g of natural flake graphite to 150 mL of sulfuric acid/phosphoric acid ($H_2SO_4$:$HPO_4$=9:1, v/v) mixed acid solution, followed by adding 18 g of potassium permanganate, mixed evenly, raise the system temperature to 50° C., reacted for 12 h, washed the products with hydrochloric acid and deionized water respectively until the pH is neutral and the rotational speed was 11000 r/min, freeze-dried to get the graphite oxide.

Step (2) added the graphite oxide of Step (1) to the water, obtained aqueous solution of graphene oxide by ultrasonic dispersion, the concentration of the oxidized graphite is 4 mg/mL, took 60 mL of the aqueous solution in the Teflon-lined autoclave, added 10 mL of phytic acid, mixed evenly, and then placed in the reaction 12 h at 150° C.

Step (3) collected the cylindrical graphene hydrogel by step (2), soaked and washed with deionized water for 24 h, obtained the macro porous graphene hydrogel finally by freeze-drying.

Embodiment 6

In this embodiment, the present application provides a compressive graphene hydrogel using the following method:

Step (1) slowly added 3 g of natural flake graphite to 150 mL of sulfuric acid/phosphoric acid (H2SO4:H3PO4=9:1, v/v) mixed acid solution, followed by adding 18 g of potassium permanganate, mixed evenly, raise the system temperature to 50° C., reacted for 12 h, washed the products with hydrochloric acid and deionized water respectively until the pH is neutral and the rotational speed was 11000 r/min, freeze-dried to get the graphite oxide.

Step (2) added the graphite oxide of Step (1) to the water, obtained aqueous solution of graphene oxide by ultrasonic dispersion, the concentration of the oxidized graphite is 4 mg/mL, took 60 mL of the aqueous solution in the Teflon-lined autoclave, added 1, 2, 4, 10 mL of phytic acid respectively, mixed evenly, and then placed in the reaction 12 h at 150° C.

Step (3) collected the cylindrical graphene hydrogel by step (2), soaked and washed with deionized water 24 h, obtained the macro porous graphene hydrogel finally by freeze-drying.

Figure 4:
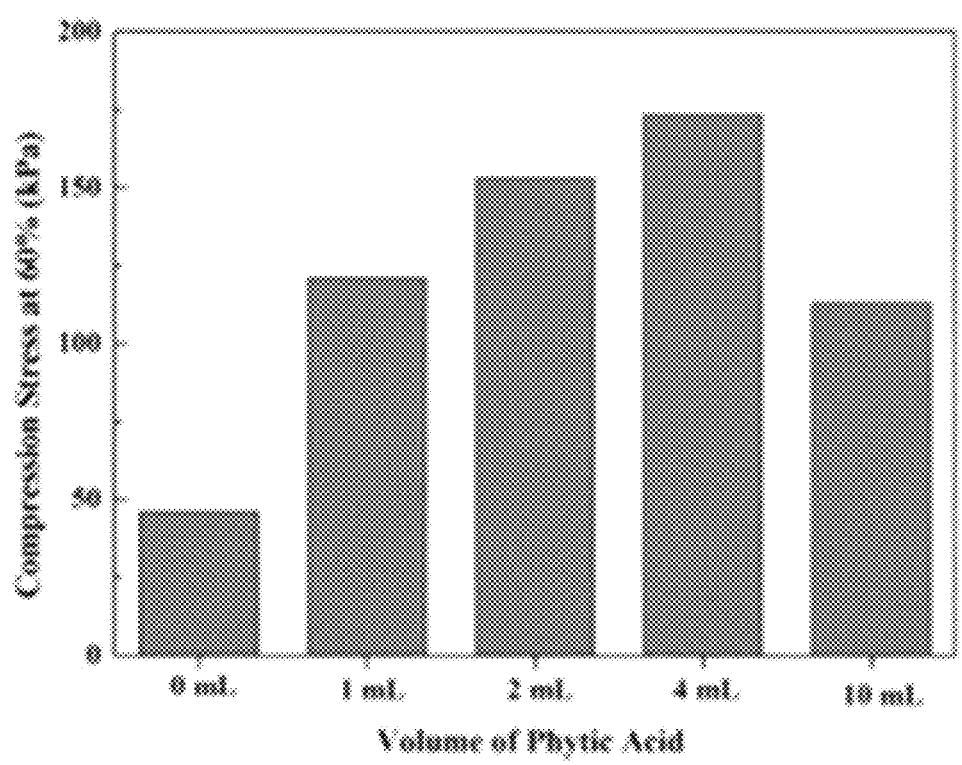
FIG. 4 shows the bar graphs of compressive modulus of graphene hydrogels prepared by Embodiment 6 with different doping contents.

Step (4) FIG. 4 shows the bar graphs of compressive modulus of graphene hydrogels prepared by Embodiment 6 with different doping contents. As can be seen from the figure, with the increase of the doping amount of phytic acid, the compressive modulus of graphene hydrogel has been improved, when the doping amount of phytic acid is 4 mL, the modulus reaches an extreme value (174.8 kPa). Therefore, the graphene hydrogel prepared by the invention can meet the requirements of practical use, and is expected to be a substitute for electrode materials of super capacitors.

The above is only a preferred embodiment of the invention, equal changes and modification within the scope of the invention patent, all should be the scope of the invention.

What is claimed is:

1. A process of preparing a compressive graphene hydrogel by using a hydrothermal method, the process comprising:
   using oxidized graphene as precursor;
   adding water into said oxidized graphene to make an aqueous solution;
   placing said aqueous solution in a reactor, lining,
   doping said aqueous solution with phytic acid, and carrying out a reaction after mixing;
   freeze-drying the reaction product to get said compressive graphene hydrogel.

2. The process of claim 1, wherein the oxidized graphene in said aqueous solution is at a concentration of 1-4 mg/mL.

3. The process of claim 1, wherein the aqueous solution after being doped has 1-10 mL of phytic acid for every 60 mL of the aqueous solution.

4. The process of claim 1, wherein the reaction is carried out at temperature of 120-180° C. for 12-24 hours.

* * * * *